United States Patent [19]

Hernandez

[11] Patent Number: 4,672,292
[45] Date of Patent: Jun. 9, 1987

[54] SYSTEM FOR CHARGING SETS OF RECHARGEABLE BATTERIES

[75] Inventor: Jean R. Hernandez, Villeuranne, France

[73] Assignee: Black & Decker Inc., Newark, Del.

[21] Appl. No.: 863,178

[22] Filed: May 14, 1986

[30] Foreign Application Priority Data

May 14, 1985 [FR] France ............................ 85 07294

[51] Int. Cl.$^4$ .................... H02J 7/04; H01M 10/46
[52] U.S. Cl. .................................... 320/2; 174/48; 320/15
[58] Field of Search ........................ 320/2-5, 320/15; 174/48; 433/98

[56] References Cited

U.S. PATENT DOCUMENTS

| | | | |
|---|---|---|---|
| 3,696,283 | 10/1972 | Ackley, III | 320/2 |
| 3,980,940 | 9/1976 | Mabuchi et al. | 320/2 |
| 4,084,123 | 4/1978 | Lineback et al. | 320/2 |
| 4,096,428 | 1/1978 | Hanson et al. | 433/98 X |
| 4,225,814 | 9/1980 | Gantz et al. | 320/2 |
| 4,323,836 | 4/1982 | Rice | 320/2 |
| 4,500,150 | 2/1985 | Leibensperger et al. | 174/48 X |
| 4,591,777 | 5/1986 | McCarty et al. | 320/2 |

FOREIGN PATENT DOCUMENTS

| | | |
|---|---|---|
| 1240286 | 7/1960 | France . |
| 1533378 | 7/1968 | France . |
| 262473 | 5/1964 | Netherlands . |
| 2106728 | 4/1983 | United Kingdom . |

Primary Examiner—R. J. Hickey
Attorney, Agent, or Firm—Edward D. Murphy; Harold Weinstein; Edward D. C. Bartlett

[57] ABSTRACT

The present invention relates to a system for charging a plurality of sets of rechargeable electric batteries incorporated in respective portable appliances. The system comprises, in combination: a DC constant current generator circuit (C) having first and second output terminals (13, 14); and a plurality of bases ($E_1, \ldots, E_x, \ldots, E_n$), each base comprising: mechanical link means; means for receiving the body of a portable appliance containing a rechargeable battery set; first and second electrical output connection elements ($CO_{x1}, CO_{x2}$) for connection to the terminals of a rechargeable battery set when associated therewith for charging; and electrical link means ($I_{x1}, I_{x2}; O_{x1}, O_{x2}$) for connecting the output connection elements ($CO_{x1}, CO_{x2}$) of the base and an associated rechargeable battery set in series with said first and second output terminals (13, 14) of said current generator circuit (C) to enable said rechargeable battery sets to be charged with constant direct current.

3 Claims, 8 Drawing Figures

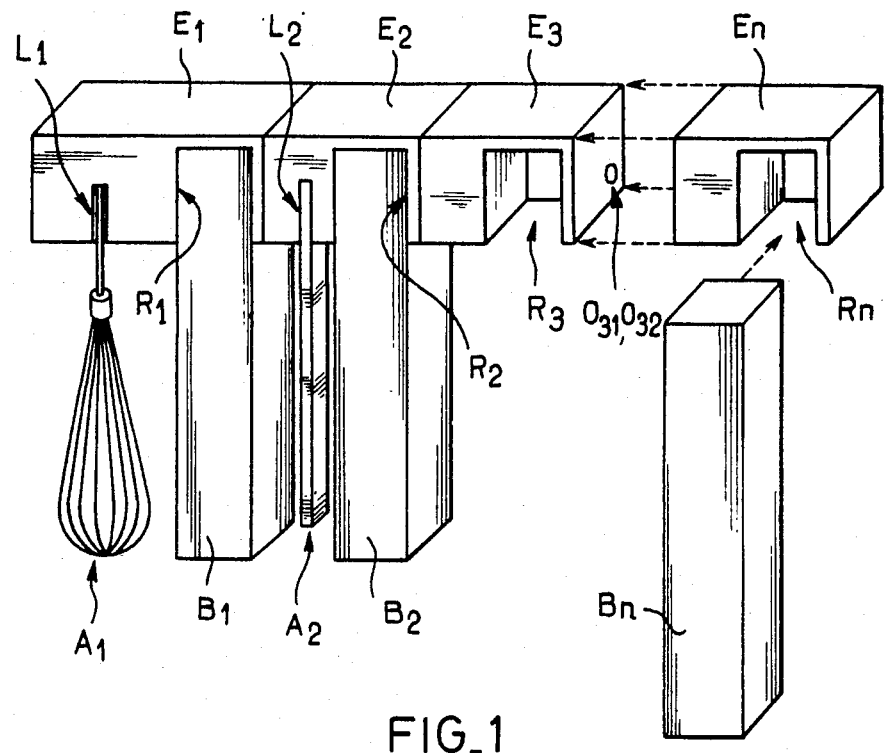
FIG_1
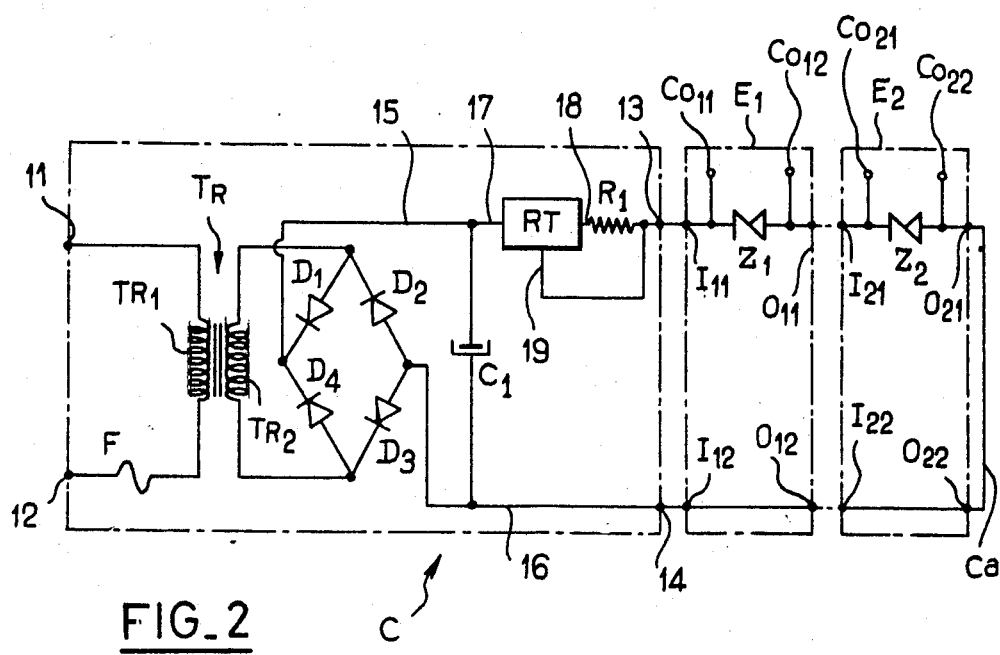
FIG_2

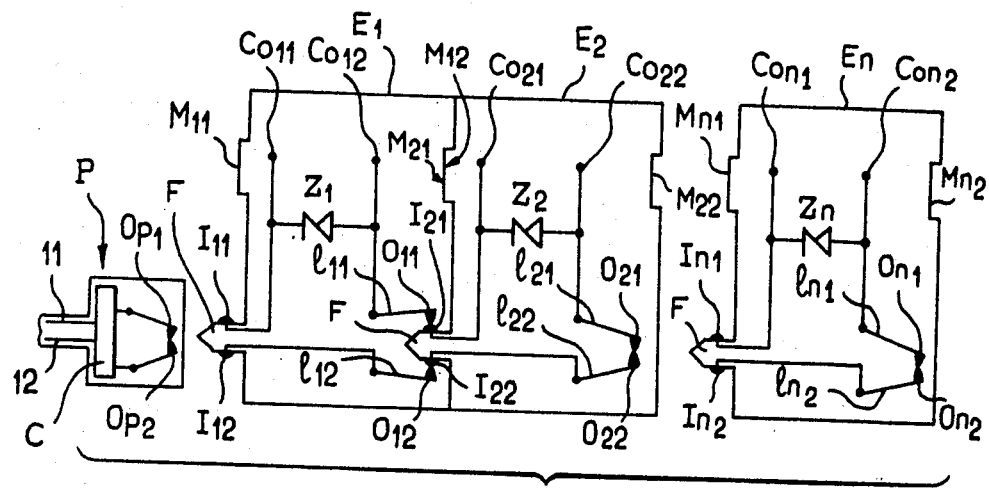
FIG_3
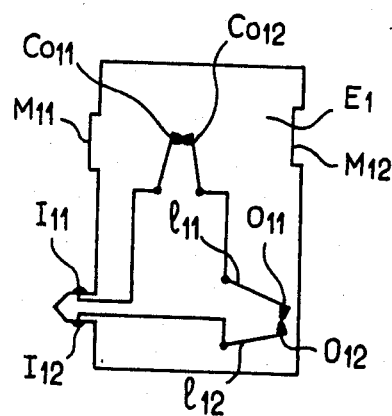
FIG_4
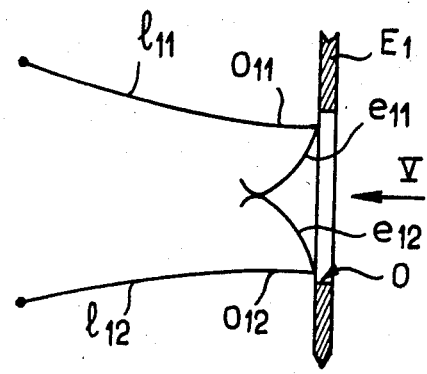
FIG_5a
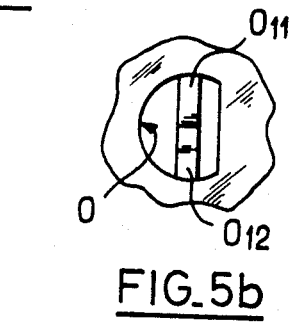
FIG_5b
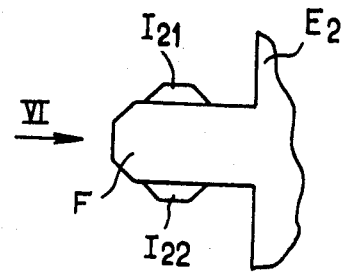
FIG_6a
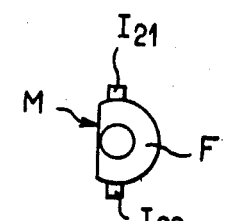
FIG_6b

SYSTEM FOR CHARGING SETS OF RECHARGEABLE BATTERIES

The present invention relates to systems used for charging rechargeable electrical batteries, and in particular nickelcadmium (nicad) batteries integrated in cordless portable electrical appliances such as drills, saws, sanders, lamps vacuum cleaners, kitchen appliances used for grinding, mixing or chopping food, and other such appliances.

BACKGROUND OF THE INVENTION

Numerous systems already been proposed for charging rechargeable batteries. For example, the following patent publications all relate to this field: FR-A-1 240 286; FR-A-1 533 378; U.S. Pat. No. 3,980,940; and U.S. Pat. No. 4,084,123.

French Pat. No. 1,240,286 describes an installation for charging rechargeable batteries and comprising a voltage generator feeding a plurality of charging stations. The charging stations are associated with respective resistances which are connected in series across the terminals of the voltage generator when the charging stations are empty. When a battery is connected to a charging station, the associated resistance is disconnected from the circuit. The battery is thus connected to the terminals of a voltage generator in series with the resistances or batteries of the other stations. In order to ensure that such an installation operates properly, the charging current which passes through the batteries must neither be too low, in which case the batteries charge too slowly, nor too high, in which case the batteries are soon damaged.

The value of the current flowing through the batteries connected to the charging stations is defined by the ratio of the supply voltage divided by the sum of the impedances of the resistances and batteries connected in series between the terminals of the voltage generator. Proper operation of this installation thus relies on the impedance of the batteries being constant and equal to the associated resistances which are disconnected when batteries are installed for charging. In practice, battery impedances vary from one battery to another, and they change with time. The installation described in document FR-A-1 240 286 is thus not entirely satisfactory.

French Pat. No. 1,533,378 describes another system for charging a rechargeable battery and comprising an AC voltage generator, and a half-wave rectifying diode connected in series with a resistance for limiting the charging current.

U.S. Pat. No. 3,980,940 relates to a system for equalizing the charge on a plurality of rechargeable batteries connected in series. The system comprises a set of impedances for respective connection to the terminals of different ones of the batteries. When charging, these impedances may be constituted by diodes having identical threshold voltages which define the maximum charge of each battery. When discharging, these impedances may be constituted simply by resistances which cause the batteries to discharge identically.

U.S. Pat. No. 4,084,123 proposes integrating a rectifier bridge in each battery pack so as to enable battery packs to be charged by connection to an AC voltage source.

Proposals have also been made for various kinds of electrical appliances which are portable and cordless. These appliances are powered by internal rechargeable batteries, and they are intended to be periodically placed on associated supports which include charging systems for keeping the batteries properly charged at all times, so that the appliances are constantly ready for use.

A portable electrical vacuum cleaner of this type is described, for example, in Black and Decker's British patent application published under the No. 2 432 857.

The present proliferation of cordless appliances of this type leads to the user buying and installing a large number of appliance supports, each including its own charging system.

Preferred embodiments of the present invention provide a simple, reliable and cheap system suitable for charging a plurality of rechargeable battery sets incorporated in respective cordless appliances, thereby avoiding the proliferation of charging systems.

An aim of the present invention is to provide a charging system suitable for charging a variable number of battery sets.

Another aim of the present invention is to provide a cheap modular system serving both as a charger for a plurality of battery sets and as a storage support for the bodies of portable electrical appliances and their accessories, with the system being readily adaptable by the user as a function of the appliances to be charged and stored.

Another aim of the present invention is to provide a system in which it is cheap and easy to extend a pre-existing installation to include a support for storing a newly-purchased appliance and for charging a battery set contained therein.

Another aim of the present invention is to provide a system for charging a plurality of battery sets without requiring any monitoring on the part of the user, and which can be used by a non-specialist.

SUMMARY OF THE INVENTION

The present invention provides a system which comprises, in combination:

firstly a DC constant current generator circuit having first and second output terminals; and secondly at least one base, where each base comprises:

first and second electrical output connection elements for connection to the terminals of a rechargeable battery set when associated therewith for charging; and electrical link means for connecting the output connection elements of the base and an associated rechargeable battery set in series with said first and second output terminals of said current generator circuit to enable at least one rechargeable battery set to be charged with constant direct current.

The use of a DC constant current generator ensures that the rechargeable batteries are properly charged, regardless of the number of appliance-supporting bases which may be associated with the generator.

In addition, the modular disposition of the bases makes it possible for any user to easily adapt an installation to requirements while using only a single current generator circuit.

Each base preferably also includes a switchable conductor member which is switchable between a conductive state and non-conductive state, and which is adapted to occupy its non-conductive state when said output connection elements are connected to an associated rechargeable battery set, and to occupy its conductive state when said output connection elements are not connected to an associated rechargeable battery set.

This disposition makes it possible to safely charge or maintain the charge in battery sets fitted to corresponding bases, even while one or more of the bases is not fitted with a battery set. Unaffected battery sets will also continue to be charged in the event of various kinds of fault in the output electrical connection elements of one of the bases, or in the electrical connections within a battery set, or in the batteries themselves.

Advantageously, a system for charging a plurality of rechargeable electric battery sets incorporated in respective portable appliances comprises:

a DC constant current generator circuit having first and second output terminals;

a plurality of switchable conductor members switchable between a conductive state and a non-conductive state;

electrical link means suitable for connecting said switchable conductor members in series with the output terminals of the current generator circuit; and pairs of first and second electrical output connection elements connected to respective terminals of each switchable conductor member for charging the rechargeable battery sets of portable appliances when connected to said pairs of connection elements;

wherein each switchable conductor member is adapted to occupy its conductive state when a rechargeable battery set is not connected to the pair of connection elements associated therewith, and to occupy its non-conductive state when a rechargeable battery set is connected to the pair of connection elements associated therewith.

Advantageously, each base includes first and second input terminals and first and second output terminals adapted to be respectively connected to complementary terminals of adjacent bases, the first input terminal of a base being connected to the first output terminal of the same base via a switchable conductor member, while the second input terminal of a base is directly connected to the second output terminal of the same base.

Also advantageously, each base includes first and second input terminals and first and second output terminals adapted to be respectively connected to complementary terminals of adjacent bases, and the output terminals are constituted by a jack type connector adapted to interconnect the output terminals of a base when in the rest state and to separate said output terminals and connect them respectively to the input terminals of an adjacent base when said output terminals and said input terminals of an adjacent base are caused to co-operate.

The present invention also provides individual bases for a system as defined above.

BRIEF DESCRIPTION OF THE DRAWINGS

Embodiments of the invention are described by way of example with reference to the accompanying drawings, in which:

FIG. 1 is a diagrammatic perspective view of a system in accordance with the invention and including a plurality of associated bases;

FIG. 2 is a circuit diagram of a charger for use in a system in accordance with the present invention;

FIGS. 3 and 4 show two variant embodiments of electrical link means for linking bases and their electrical output connection means; and FIGS. 5a, 5b, 6a, and 6b are diagrams showing the structure of the inlet and outlet jack-type terminals integrated in the bases, with FIGS. 5b and 6b being side views of the means shown in FIGS. 5a and 6a as seen along respective lines V and VI.

DESCRIPTION OF PREFERRED EMBODIMENTS

FIG. 1 is a diagram showing a plurality of bases $E_1$, $E_2$, $E_3$, ... $E_n$ each suitable for receiving the motor-block of a portable appliance containing a rechargeable battery set.

In this figure, and in the following description, subscripts 1 to n are used to distinguish similar items in different bases, and the subscript x is used to represent an unspecified one of the subscripts 1 to n.

Each base $E_x$ includes mechanical link means $M_{x1}$ and $M_{x2}$ shown diagrammatically in FIGS. 3 and 4 as structures of complementary shape suitable for fixing the bases to one another.

Each base $E_x$ also includes means for receiving the motor-block or body $B_x$ of a corresponding portable appliance containing a rechargeable battery set.

In the diagrammatic example shown in FIG. 1, each base $E_x$ is in the form of a generally rectangular block having a cavity $R_x$ which is open to the front face and to the bottom face of the base $E_x$ in order to receive the end of the abovementioned motor-block $B_x$.

Advantageously, the bases $E_x$ also include recesses such as $L_1$ or $L_2$ or equivalent means for receiving accessories such as $A_1$ or $A_2$ for the appliances.

The bases $E_x$ and the motor blocks $B_x$ are shown highly diagrammatically in FIG. 1, and this figure must not be taken as limiting the range of possible shapes for the bases and the motor-blocks.

The motor-block receiving cavities $R_x$ and the mechanical link means $M_{x1}$ and $M_{x2}$ may be made in any suitable conventional manner.

The electrical circuit shown in FIG. 2 is now described.

This circuit comprises a DC constant current generator C having input terminals 11 and 12 connected to an AC power supply at mains voltage, e.g. 220 V.

The constant current generator circuit C is essentially constituted by a transformer TR, a full-wave rectifier $D_1$ to $D_4$, a smoothing filter $C_1$ and a current regulator $RT$-$R_1$.

The primary winding $TR_1$ of the transformer TR is connected to the input terminals 11 and 12 via a fuse F. The secondary winding $TR_2$ of the transformer TR feeds a conventional full-wave rectifier bridge comprising four diodes $D_1$ to $D_4$.

In conventional manner, the potential present at the cathodes of diodes $D_1$ and $D_4$ (on wire 15) is positive relative to the potential present at the anodes of diodes $D_2$ and $D_3$ (on wire 16).

The smoothing filter is constituted by a capacitor $C_1$ having its terminals connected to respective ones of said wires 15 and 16 and serves to smooth the rectified voltage from the full-wave rectifier bridge.

The positive output from the rectifier (wire 15) is connected to the input of a voltage regulator circuit RT, e.g. an LM317 type of voltage regulator.

A load resistor $R_1$ is connected between the output terminal 18 of the voltage regulator RT and its adjust terminal 19. The DC constant current generator circuit C has output terminals 13 and 14 which are respectively connected to the common point between the load resistor $R_1$ and the adjust terminal 19 and to the wire 16 which provides a return path to the diodes $D_2$ and $D_3$.

The above-described circuit C outputs a constant direct current between its terminals 13 and 14. Ignoring the current flowing through the voltage regulator adjust terminal 19, the current output from the circuit C is equal to the ratio of the voltage between its terminals 18 and 19 divided by the impedance of the resistor $R_1$.

Consequently, the circuit C can be used to charge a plurality of rechargeable battery sets connected in series between its output terminals and disposed on respective ones of the bases $E_x$.

The resistance of the load resistor $R_1$ is chosen to provide a charging current which is low enough to ensure an acceptable lifetime for the rechargeable batteries.

For use with nicad rechargeable batteries, the resistance of $R_1$ can be chosen so that the circuit C provides a constant output current of about 80 mA, thereby enabling battery sets to be fully recharged over a period of about 24 hours.

In order to make it possible to assemble a plurality of bases $E_x$ and to connect a variable number of rechargeable battery sets in series with the constant current generator circuit C, the bases $E_x$ include: firstly respective pairs of output electrical connection elements $CO_{x1}$ and $CO_{x2}$ which are connected to the terminals of respective rechargeable battery sets when the bodies $B_x$ housing the battery sets are placed on the bases $E_x$; and secondly electrical input and output link means $I_{x1}$, $I_{x2}$, $O_{x1}$, and $O_{x2}$ for connecting the said output connection elements $CO_{x1}$ and $CO_{x2}$ and any battery set associated therewith in series with the terminals of the constant current generator circuit C, as shown in FIG. 2.

In the presently preferred embodiment, each base $E_x$ also includes a conductor member $Z_x$ which is switchable between a conducting condition and a non-conducting condition and which is adapted to occupy its non-conducting condition when a battery set is connected to the associated output connection elements $CO_{x1}$ and $CO_{x2}$ and to occupy its conducting condition when such a battery set is not connected to the associated output connection elements $CO_{x1}$ and $CO_{x2}$.

As mentioned above, this disposition makes it possible to recharge and to maintain charge safely in all such battery sets placed on bases $E_x$, even while one or more of the bases $E_x$ is not supporting a battery set.

Thus, in a base $E_x$ fitted with a battery set connected to its output connection elements $CO_{x1}$ and $CO_{x2}$, the switchable conductor member $Z_x$ is non-conductive and the charging current delivered by the circuit C passes through the battery set; whereas in a base $E_x$ which does not have a battery set fitted thereto, the switchable conductor member $Z_x$ is conductive, thereby allowing the charging current to pass continuously through battery sets placed on adjacent bases.

In a first variant embodiment shown in FIGS. 2 and 3, the switchable conductor members $Z_x$ are constituted by zener diodes connected in series between corresponding pairs of output connection elements $CO_{x1}$ and $CO_{x2}$ and having voltage thresholds which are greater than the fully charged voltages of the battery sets intended for connection to said output connection elements $CO_{x1}$ and $CO_{x2}$.

Each zener diode $Z_x$ has its cathode connected closer to the positive terminal 13 of the constant current generator circuit C and has its anode connected closer to the negative terminal 14 of said circuit C.

Thus, so long as a battery set in a block $B_x$ is connected to the output connection elements $CO_{x1}$ and $CO_{x2}$ of a base $E_x$, the voltage between said elements is less than the threshold voltage of the zener diode $Z_x$, so the zener diode is in its non-conducting condition.

However, when no battery set is connected to said elements, the charging current delivered by the constant current circuit C passes through the zener diode $Z_x$.

In a second variant embodiment shown in FIG. 4, the switchable conductor members and the associated pairs of output connection elements $CO_{x1}$ and $CO_{x2}$ in each base are in the form of jack type connectors. Such a connector may comprise two blades which are resilient or which pivot under resilient bias provided by a spring for example. As shown in FIG. 4. said blades are adapted to come into contact with each other so as to pass the charging current when a battery set is not connected to the output connection elements $CO_{x1}$ and $CO_{x2}$, and they are adapted to lose contact with each other when a battery set connected so as to constrain the charging current to pass through the battery set.

As shown in FIGS. 2, 3 and 4 the link means in each base $E_x$ comprises two input terminals $I_{x1}$ and $I_{x2}$, and two output terminals $O_{x1}$ and $O_{x2}$ suitable for connection to respective complementary terminals of adjacent bases.

A first one of the input terminals $I_{x1}$ is connected to a first one of the output terminals $O_{x1}$ via the corresponding switchable conductor member $Z_x$, while the other input and output terminals $I_{x2}$ and $O_{x2}$ are directly connected together.

As more clearly shown in FIGS. 3 and 4, the output terminals $O_{x1}$ and $O_{x2}$, and the output terminals 13 and 14 of the constant current generator circuit C may be in the form of female sockets suitable for co-operating with the input terminals $I_{x1}$ and $I_{x2}$ which are provided in the form of complementary male plugs projecting from the bases $E_x$.

This disposition makes it possible to assemble a plurality of bases $E_x$ and to charge a plurality of rechargeable battery sets incorporated in respective portable appliances fitted to said bases, so long as a shunt Ca is provided at the last base $E_n$ in order to short its output terminals $O_{n1}$ and $O_{n2}$ together. In FIG. 2, the last base is $E_2$ and its output terminals shorted together by the shunt Ca are referenced $O_{21}$ and $O_{22}$.

However, it is preferable to avoid the need to use a shunt such as Ca, and, as shown in FIGS. 3 and 4, this can be done by providing the output terminals $O_{x1}$ and $O_{x2}$ in the form of jack type connectors in which the terminals are connected to each other when the connector is in the rest state, but are connected to respective input terminals $I_{(x+1)1}$ and $I_{(x+1)2}$ of an adjacent base $E_{(x+1)}$ when the adjacent base is plugged in.

Numerous jack type connector structures exist which can be used for this purpose.

FIGS. 3, 4, 5a, 5b, 6a, and 6b are diagrams showing one particular form of a suitable type of jack and jack plug. The output terminals $O_{x1}$ and $O_{x2}$ are in the form of a pair of resilient blades $1 \times 1$ and $1 \times 2$ (or in the form of a pair of spring-biassed hinged blades) which which are resiliently urged towards each other and which come into contact with each other via respective curved end portions $e_{x1}$ and $e_{x2}$ disposed next to an orifice O provided through a wall of the base.

One of the blades $1_{x1}$ is connected to the electrical output connection element $CO_{x2}$ while the other blade $1_{x2}$ is directly connected to the input terminal $I_{x2}$ of the same base.

In complementary manner, the input terminals $I_{x1}$ and $I_{x2}$ of each base are provided on either side of a prong F projecting from the base. The prong F has a tapering leading end or tip in order to facilitate separating the blades $1_{(x-1)1}$ and $1_{(x-1)2}$ in an adjacent base when the prong F is inserted into the orifice O thereof.

Preferably, and as illustrated in FIGS. 5b and 6b, the prong F is of non-symmetrical cross section and the orifice is complementary thereto in order to provide a keying arrangement.

As shown in FIG. 6b, the prong F is generally cylindrical in shape having a tapering or rounded tip and provided with a longitudinally-extending flat M.

As shown diagrammatically in FIG. 3, the DC constant current generator circuit C may be located on a printed circuit card housed in a plug P having input pins 11 and 12 for insertion into an AC mains outlet and having two output terminals $O_{p1}$ and $O_{p2}$ connected to the outputs 13 and 14 of the constant current generator and constituted by a jack type connector suitable for co-operating with the prong F and the input terminals $I_{11}$ and $I_{12}$ of a base $E_1$ which is plugged therein.

Naturally, it is also possible for the current generator circuit C to be integrated in one of the bases $E_x$.

In a variant, a charger system in accordance with the present invention may be housed in a single housing which contains the current generator C and which includes a plurality of outlets $CO_{11}$-$CO_{12}$, ... $CO_{n1}$-$CO_{n2}$ for receiving different sets of rechargeable batteries incorporated in respective portable appliances.

The present invention is not limited to the specific embodiments which are described above, but extends to any variant which comes within the scope of the claims.

For example, the switchable conductor members $Z_x$ provided in each base between the output electrical connection elements $CO_{x1}$ and $CO_{x2}$ could be omitted.

Removing any one of the sets of rechargeable batteries would then open the circuit between the corresponding electrical connection elements $CO_{x1}$ and $CO_{x2}$, and would consequently interrupt the charging current delivered by the generator circuit C. In this case, the rechargeable battery sets are only recharged when every one of the bases is fitted with such a battery set.

The number of bases which can be connected to a single constant current generator circuit C, and thus the number of rechargeable battery sets which can be recharged by a single generator, depends on the characteristics of the generator, and in particular on the power which can be passed by its transformer.

I claim:

1. A system for charging a plurality of rechargeable electric batteries incorporated in a plurality of portable appliances, comprising the combination of:
   (A) a DC current generator having a pair of DC output terminals;
   (B) at least one support base having means for supporting a portable appliance therein, and means for mechanically connecting said at least one support base to another support base;
   (C) mechanical means for connecting said at least one support base to said DC current generator, and electrical means for electrically connecting said at least one support base to said DC current generator to supply recharging current to said one support base;
   (D) said at least one support base including a pair of output electrical connection means for connecting to at least one rechargeable battery in a portable appliance for recharging the battery when the appliance is supported in said at least one support base; and
   (E) said at least one support base including semiconductor means of the Zener diode type connected across said pair of output electrical connection means for blocking the flow of current directly between said pair of output electrical connection means and directing the flow of current through the rechargeable battery when the appliance is supported in said at least one support base, and for directing the flow of current across said pair of output electrical connection means when an appliance is not supported in said at least one support base.

2. A support base for supporting and recharging a portable electric appliance having at least one rechargeable battery therein, comprising in combination:
   (A) first mechanical means for mechanically connecting said support base to a source of DC charging current;
   (B) electrical connection means for electrically connecting said support base to a source of DC charging current;
   (C) second mechanical means for mechanically connecting said support base to an additional base for supporting an additional rechageable portable appliance;
   (D) said support base further including a pair of output terminal means for electrical connection to the rechargeable battery in a portable appliance when said appliance is supported by said support base; and
   (E) said support base further including semiconductor means electrically connected between said pair of output terminal means, said semiconductor means having a voltage threshold greater than the charged voltage of the rechargeable battery in the appliance whereby charging current is directed through the rechargeable battery when the appliance is supported by said support base, and whereby said charging current flows directly across said pair of output terminal means when an appliance is not supported by said support base.

3. The support base as claimed in claim 2, in which said semiconductor means comprises a Zener type diode.

* * * * *